US012180847B2

(12) United States Patent
Millier et al.

(10) Patent No.: US 12,180,847 B2
(45) Date of Patent: Dec. 31, 2024

(54) ELECTRIC MODULE FOR AN AIRCRAFT TURBOMACHINE

(71) Applicant: SAFRAN AIRCRAFT ENGINES, Paris (FR)

(72) Inventors: Vincent François Georges Millier, Moissy-Cramayel (FR); Loïc Paul Yves Guillotel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 303 days.

(21) Appl. No.: 17/779,203

(22) PCT Filed: Nov. 24, 2020

(86) PCT No.: PCT/FR2020/052158
§ 371 (c)(1),
(2) Date: May 24, 2022

(87) PCT Pub. No.: WO2021/111060
PCT Pub. Date: Jun. 10, 2021

(65) Prior Publication Data
US 2022/0403751 A1   Dec. 22, 2022

(30) Foreign Application Priority Data

Dec. 3, 2019  (FR) ..................................... 1913668

(51) Int. Cl.
*F01D 15/10*  (2006.01)
(52) U.S. Cl.
CPC ........ *F01D 15/10* (2013.01); *F05D 2220/323* (2013.01); *F05D 2220/70* (2013.01); *F05D 2230/72* (2013.01); *F05D 2240/12* (2013.01)

(58) Field of Classification Search
CPC .......... F01D 15/10; F01D 25/246; F02C 6/14; B64D 27/33
See application file for complete search history.

(56) References Cited

U.S. PATENT DOCUMENTS 3,264,482 A * 8/1966 Clark ........................ F02C 7/32
                                                        290/38 A
5,118,253 A * 6/1992 Balkcum, III ........ F01D 25/246
                                                        415/189

(Continued)

FOREIGN PATENT DOCUMENTS

EP   3 246 528 A1   11/2017
EP   3 553 295 A1   10/2019

(Continued)

OTHER PUBLICATIONS

English translation of FR3039225 (Year: 2017).*
International Search Report mailed Jan. 19, 2021, issued in corresponding International Application No. PCT/FR2020/052158, filed Nov. 24, 2020, 6 pages.

(Continued)

*Primary Examiner* — Thomas P Burke
(74) *Attorney, Agent, or Firm* — CHRISTENSEN O'CONNOR JOHNSON KINDNESS PLLC

(57) ABSTRACT

An electric module for an aircraft turbomachine includes an electric machine stator having an annular shape around an axis (A) and being configured to surround a rotor of the electric machine, and an annular support element of the stator. The support element includes an outer annular surface configured to be swept over by a gas stream (F) from the turbomachine with a view to conductively cooling the stator.

15 Claims, 6 Drawing Sheets

(56) References Cited

U.S. PATENT DOCUMENTS

| | | | | |
|---|---|---|---|---|
| 5,237,817 | A * | 8/1993 | Bornemisza | F02C 3/05 |
| | | | | 415/196 |
| 9,149,865 | B2 * | 10/2015 | Smeets | F01D 25/24 |
| 2009/0120058 | A1 * | 5/2009 | Suciu | F02C 3/08 |
| | | | | 60/226.1 |
| 2013/0294897 | A1 * | 11/2013 | Grover | F01D 9/041 |
| | | | | 415/173.7 |
| 2016/0160867 | A1 * | 6/2016 | Gehlot | F02C 7/36 |
| | | | | 60/805 |
| 2016/0195015 | A1 * | 7/2016 | Little | F02C 7/04 |
| | | | | 415/213.1 |
| 2016/0252102 | A1 * | 9/2016 | Boisson | F04D 29/326 |
| | | | | 416/193 A |
| 2017/0335795 | A1 * | 11/2017 | Klemen | H02K 5/203 |
| 2020/0063606 | A1 * | 2/2020 | Miller | F02K 5/00 |
| 2021/0355840 | A1 * | 11/2021 | Charier | F01D 15/10 |
| 2021/0396141 | A1 * | 12/2021 | Charier | F02C 7/36 |
| 2023/0002066 | A1 * | 1/2023 | Millier | B64D 29/00 |
| 2023/0016978 | A1 * | 1/2023 | Millier | H02K 5/225 |

FOREIGN PATENT DOCUMENTS

| | | |
|---|---|---|
| FR | 2 842 565 A1 | 1/2004 |
| FR | 2 896 537 A1 | 7/2007 |
| FR | 2 922 265 A1 | 4/2009 |
| FR | 3039225 A1 * | 1/2017 |
| GB | 1141001 A | 1/1969 |

OTHER PUBLICATIONS

Written Opinion mailed Jan. 19, 2021, issued in corresponding International Application No. PCT/FR2020/052158, filed Nov. 24, 2020, 5 pages.

English translation of Written Opinion mailed Jan. 19, 2021, issued in corresponding International Application No. PCT/FR2020/052158, filed Nov. 24, 2020, 4 pages.

International Preliminary Report on Patentability mailed May 17, 2022, issued in corresponding International Application No. PCT/FR2020/052158, filed Nov. 24, 2020, 6 pages.

* cited by examiner

ELECTRIC MODULE FOR AN AIRCRAFT TURBOMACHINE

FIELD OF THE DISCLOSURE

The present disclosure relates to an electric module for an aircraft turbomachine as well as to a method for maintenance of this turbomachine.

BACKGROUND

The prior art comprises in particular the documents FR-A1-2 842 565, FR-A1-2 896 537 and FR-A1-2 922 265, which describe turbomachines equipped with electric machines. The prior art also comprises the documents GB-A-1 141 001, US-A-3 264 482, EP-A1-3 246 528 and EP-A1-3 553 295.

The aeronautical world is now asking many questions about the relevance of using hybrid engines for commercial aviation. The use of electrical energy is now considered not only to meet the functions of the aircraft but also to electrify the functions of the turbomachine.

This observation leads to the study of hybrid engine architecture solutions, combining fossil fuel energy and electrical energy to ensure the driving of the propulsion portion (fan of the turbomachine) and the powering of certain engine and/or aircraft functions.

These architectures can in particular be based on a high bypass ratio and reducer type architecture, but also on a multiple body architecture (2 or 3). In these architectures, the turbomachine comprises a low-pressure body and a high-pressure body, each body comprising a shaft connecting a rotor of a compressor to a rotor of a turbine.

It is known to equip an aircraft turbomachine with an electric machine. We recall that an electric machine is an electromechanical device based on the electromagnetism allowing the conversion of electrical energy into work or mechanical energy for example. This process is reversible and can be used to produce electricity.

Thus, depending on the final use of a machine, we use the terms of:
- generator to designate an electric machine producing electrical energy from mechanical energy,
- motor for an electric machine producing a mechanical energy from electrical energy.

An electric machine can also behave in motor mode as well as in generator mode.

The integration of a high-power electric machine on the low-pressure body of a turbomachine, in particular of the high bypass ratio type, is very complex. Several installation areas are possible but the advantages and the disadvantages of each are numerous and diverse (problem of mechanical integration of the machine, temperature resistance of the machine, accessibility of the machine, etc.).

One solution to this problem would be to integrate the electric machine directly downstream of the fan of the turbomachine. However, one difficulty would be the connection of this machine to the power electronic circuit which is usually located at a distance from the machine.

The use of power harnesses would pose some technical problems in this environment. The large diameter harnesses have very large bending radii, which would not be compatible with this environment. The integration of harnesses would require supports to limit the transmission of vibrations to the surrounding parts and their damage.

Another problem with this type of electric machine is its maintenance and its access in a restricted environment.

The present disclosure proposes a solution to at least some of the problems discussed above.

SUMMARY

The disclosure proposes an electric module for an aircraft turbomachine, the module comprising:
- a stator of an electric machine, this stator having an annular shape about an axis and being intended to surround a rotor of the electric machine,
- an annular support element for the stator, this element comprising an external annular surface configured to be swept by a gas flow from the turbomachine, in order to cool the stator by conduction, characterised in that the annular element comprises:
- an annular support which surrounds and covers at least one portion of the stator and which is attached to the external periphery of the stator, this support comprising at least one flange for attaching to a member of the turbomachine, this flange being located at the downstream end of the stator, and
- an annular cover which surrounds and covers at least one portion of the support and which comprises the surface swept by the gas flow.

In the present application, a module is defined as an assembly of elements that is configured to be attached in a simplified and rapid manner to another module, i.e. to another assembly of parts. The modularity of a turbomachine is advantageous in that it makes it easier and therefore more economical to assemble and disassemble, for example in the scope of a maintenance operation.

The module according to the disclosure represents a portion of an electric machine, namely the portion comprising the stator of the electric machine. This module is intended to be attached to a stationary or stator element of the turbomachine, as part of another module, and to surround the rotor of the electric machine which is also intended to be attached to another element or module, this time of rotor, of the turbomachine. The electric module is, for example, attached to a module comprising an inlet casing of the turbomachine, and the rotor of the electric machine is, for example, attached to a fan module of the turbomachine.

The electric module essentially comprises two portions, namely the stator and its support element. This support element is formed by the assembly of an annular support and a cover which is intended to be swept by a gas flow in order to cool the stator of the electric machine by conduction.

The module according to the disclosure may comprise one or more of the following characteristics, taken alone or in combination with each other:
- the support comprises a cylindrical wall covering the stator and connected by its downstream end to the flange which is generally U-shaped in cross-section to define an annular space for electrical connection of the stator;
- the cover comprises at an upstream end an internal cylindrical surface configured to cooperate with annular wipers of a labyrinth seal;
- the surface swept by the gas flow extends over the entire longitudinal extent of the cover;
- the cover comprises orifices oriented substantially radially with respect to the axis, these orifices being aligned with threaded holes formed in the support, screws being configured to be screwed into the orifices and the holes in order to secure the cover to the support;

the cover comprises at its downstream end an annular groove oriented axially downstream, in order to receive a peripheral edge of another member of the turbomachine.

The disclosure also proposes an aircraft turbomachine, comprising:
- a gas generator having a longitudinal axis,
- a fan located at an upstream end of the gas generator and configured to rotate about the axis, and
- an electric machine with a generally annular shape which is mounted coaxially downstream of the fan, and which comprises a rotor rotatably coupled to the fan, and a module as described above,
- the fan being configured to generate a main gas flow, a portion of which flows in a primary annular duct of the gas generator to form a primary flow, and another portion of which flows in a secondary annular duct extending between the gas generator and the nacelle casing to form a secondary flow,
- the primary duct being delimited by a first and a second annular envelopes coaxial with the gas generator, the primary duct being traversed by straightener bladings, referred to as IGV, for connecting the first and second envelopes, as well as by tubular arms of an inlet casing located downstream of the IGV,
- the gas generator comprising a third annular envelope which coaxially surrounds the second envelope,
- the second and third envelopes being connected together at their upstream ends to form an annular splitter nose for separating the primary and secondary flows.

The present disclosure thus proposes a solution for the integration of an electric machine, a first advantage being linked to the fact that in the integration area of this machine, ideally directly downstream of the fan and thus upstream of the compressors or the compressors, the temperatures prevailing there are relatively low and thus optimal for this machine. The rotor of the machine is driven by the fan and is therefore at a relatively low speed, in particular if the turbomachine comprises a reducer. In addition, the machine is located as close as possible to the flow ducts of the flows and has a relatively large diameter and can therefore produce significant power compared to the machines of the prior technologies.

The turbomachine according to the disclosure may comprise one or more of the following characteristics, taken in isolation from each other, or in combination with each other:
- the IGV are integrally formed with annular segments of the first, second and third envelopes, this assembly being configured to be attached to the inlet casing;
- the assembly comprises at its external periphery an annular flange for attachment to the inlet casing, and at its internal periphery annular edges, respectively upstream and downstream, for support and/or engagement;
- the electric machine and the inlet casing are attached to an annular bearing support of the gas generator, the flange being applied to and attached to the bearing support and/or to the casing;
- the turbomachine comprises a nacelle casing that surrounds the gas generator, as well as bladings, referred to as OGV, for connecting the nacelle casing to the third annular envelope;
- the nacelle casing defines a secondary duct for flowing the secondary flow around the gas generator;
- The OGV are located downstream of the IGV arms and approximately in line with the tubular arms of the inlet casing;
- the second portion extends substantially in line with one of the OGV.

The present disclosure further relates to a method for maintaining a turbomachine as described above, comprising the steps consisting in:
- disassembling and removing the rotor from the electric machine,
- disassembling and removing the cover from the rest of the electric module,
- disassembling and removing the assembly,
- disassembling and removing the rest of the electric module.

DESCRIPTION OF THE DRAWINGS

The disclosure will be better understood and further details, characteristics and advantages of the disclosure will become apparent from the following description made by way of non-limiting example with reference to the attached drawings, in which.

DETAILED DESCRIPTION

Figure 1:
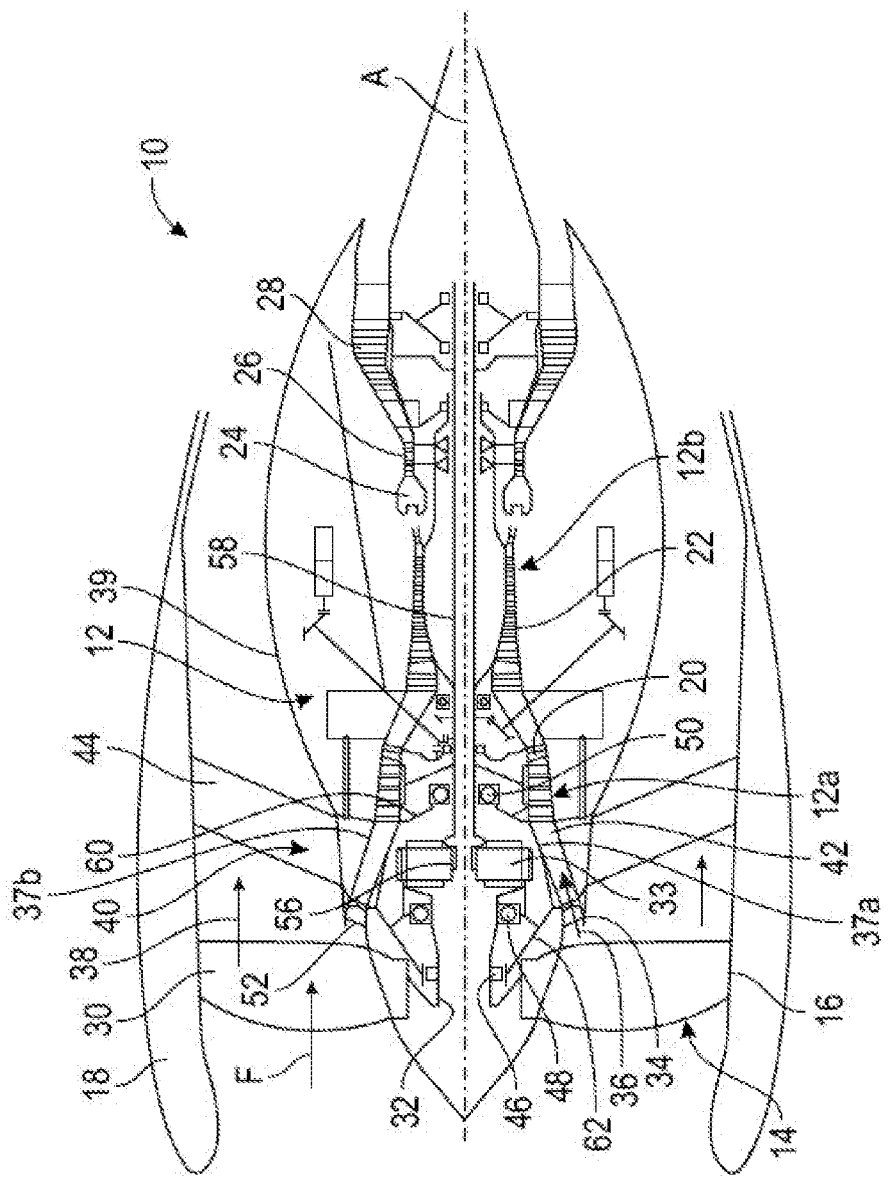
FIG. 1 is a schematic view in axial section of an aircraft turbomachine with a high bypass ratio and reducer.

First, reference is made to FIG. 1, which schematically depicts a double-body and double-flow aircraft turbomachine 10.

The turbomachine 10 conventionally comprises a gas generator 12, upstream of which is arranged a fan 14. The fan 14 is surrounded by a casing 16 which is surrounded by a nacelle 18 that extends around and along a major portion of the gas generator 12.

The gas generator 12 here comprises two bodies, namely a low-pressure body 12a or LP and a high-pressure body 12b or HP. Each body comprises a compressor and a turbine.

The terms "upstream" and "downstream" are considered along a main direction F of flow of the gases in the turbomachine 10, this direction F being parallel to the longitudinal axis A of the turbomachine.

From upstream to downstream, the gas generator 12 comprises a low-pressure compressor 20, a high-pressure compressor 22, a combustion chamber 24, a high-pressure turbine 26 and a low-pressure turbine 28.

The fan 14 comprises an annular row of vanes 30 driven in rotation by a fan shaft 32 which is connected to the rotor of the low-pressure body 12a by means of a reducer 33. The gas flow passing through the fan (arrow F) is separated upstream of the gas generator 12 by an annular splitter nose 34 into a radially internal annular flow, referred to as primary flow 36 that flows in a primary annular duct of the gas generator 12, and a radially external annular flow, referred to as secondary flow 38 that flows in a secondary annular duct between the gas generator 12 and the nacelle 18 and provides most of the thrust for the turbomachine.

An inlet casing 40 structurally connects the gas generator 12 to the casing 16 and to the nacelle 18. The inlet casing 40 comprises an annular row of radially internal arms 42 extending into the flow duct of the primary flow 36, and an annular row of radially external straightener bladings 44, referred to as OGV (acronym for Outer Gear Vane), extending into the flow duct of the secondary flow 38.

The arms 42 are generally limited in number (less than ten) and are tubular and crossed by auxiliaries.

These arms 42 have a structural role because they allow the transmission of forces between the bearing supports and the suspensions. They also have a role of passage of the auxiliaries, allowing to make cross the auxiliaries through the duct by fairing them, thus limiting the aerodynamic losses in the duct. These arms do not have a flow straightening function because they have no camber and are not sufficient in number to carry out this function.

The number of straightener bladings (OGV) is generally higher than ten. They allow to straighten the flow of the fan thanks to a specific number and camber. They also have a structural function because they support the casing around the fan (fan casing).

The flow duct of the primary flow 36 is also traversed by straightener bladings 52, referred to as IGV (acronym for Inner Gear Vane). The IGV 52 are evenly distributed around the axis A and are located upstream of the inlet casing 40 and more precisely upstream of the arms 42. These bladings allow to straighten the flow coming from the fan when it enters the primary duct. They do not have a structural role. They are in sufficient number (for example more than 10) and with a certain camber to straighten the flow of the fan penetrating the primary duct.

The flow duct of the primary flow 36 is delimited by two coaxial annular envelopes, respectively internal 37a and external 37b. In particular, the IGV 52 and the arms 42 are connected to these envelopes 37a, 37b. The flow duct of the secondary flow 38 is delimited internally by an annular envelope 39 coaxial with the envelopes 37a, 37b, and externally by the nacelle casing 16. The OGV 44 are connected to the envelopes 37b, 39.

Each of the envelopes 37a, 37b, 39 may be formed by several adjacent walls or covers.

The rotor of the low-pressure body 12a as well as the fan shaft 32 are guided upstream by bearings 46, 48 and 50. These bearings 46, 48, 50 are of the ball or roller type and each comprise an internal ring mounted on the shaft to be guided, an external ring carried by an annular bearing support and a bearing between the rings.

In a known manner, the reducer 33 is of the epicyclic gear train type and comprises a sun gear centred on the axis A, a ring gear extending around the axis, and planet gears that mesh with the sun gear and the ring gear and are carried by a planet carrier.

In the example shown, the ring gear is stationary and fixedly connected to a support 62 of the bearings 46, 48. The planet carrier is rotatable and coupled by the fan shaft 32. The sun gear of the reducer is coupled by an input shaft 56 to the main shaft 58 of the low-pressure body.

The input shaft 56 is guided by the bearing 50 which is carried by a bearing support 60. The fan shaft 32 is guided by the bearings 46, 48.

The bearing supports 60, 62 extend around the axis A and are stationary parts connected to the stator and in particular to the input casing 40.

Figure 2:
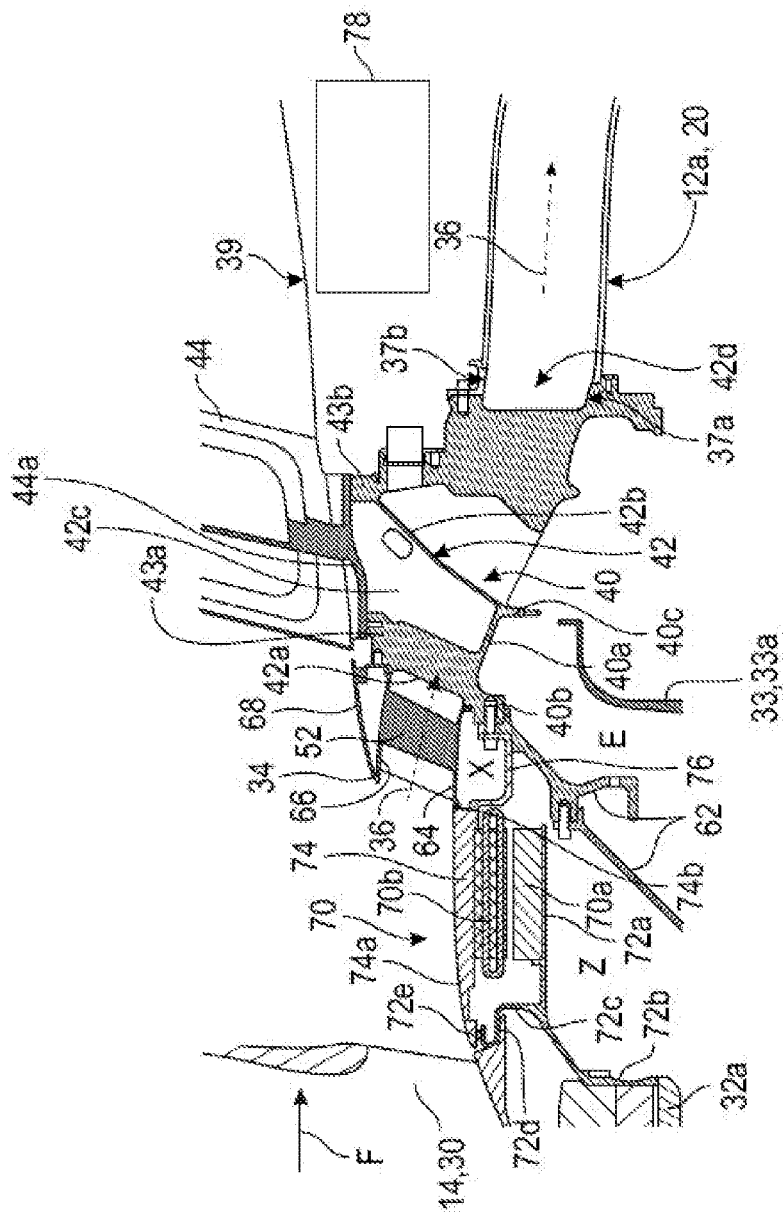
FIG. 2 is a partial schematic half-view in axial section of an aircraft turbomachine according to the disclosure equipped with an electric machine.

FIG. 2 is a larger scale, more detailed view of a portion of FIG. 1, and illustrates one embodiment of a turbomachine according to the disclosure.

The elements of FIG. 2 that have already been described with reference to FIG. 1 are designated by the same references.

In particular, FIG. 2 shows the area Z between the fan disc 32a and the reducer 33, in which an electric machine 70 is installed. Only one support 33a of the ring gear of the reducer 33 is visible in FIG. 2, this element being connected, for example, to the input casing 40 or to the bearing support 62.

The cross-section in the drawing in FIG. 2 passes through one of the IGV 52, which may be full. At least one or some of the IGV 52 may be tubular. The cut passes through an OGV 44 as well as through an arm 42 which is tubular for the passage of auxiliaries, as mentioned above. The tubular IGV 52 and/or the tubular arm 42 may have electrical connection means passing through it, which will be described in the following.

Each arm 42 comprises upstream an edge 42a and downstream an edge 42d, respectively leading edge and trailing edge of the primary flow 36.

Each arm 42 comprises an internal cavity 42c that is closed radially outward by a wall 44a of the OGV 44. This wall 44a is integrally formed with the OGV 44 and is attached to annular flanges, respectively upstream 43a and downstream 43b, of the inlet casing 40. The cavity 42c is isolated from the auxiliaries by the wall 42b.

The internal cavity 42c of each arm 42 is closed radially inward by an annular wall 40a of the inlet casing 40. At the upstream end of this wall 40a, the inlet casing 40 comprises a radially internal annular flange 40b for attachment of the bearing support 62. At the downstream end of the wall 40a, the inlet casing 40 comprises a radially internal annular flange 40c for attaching, for example, an annular gutter for collecting oil sprayed by the reducer 33 by centrifuging.

The reducer 33 as well as the bearings 46, 48, 50 visible in FIG. 1 are located in an annular lubrication enclosure E which is sealed upstream by the bearing support 62 and at least one non-visible seal, and downstream by the bearing support 60 and at least one non-visible seal. The external periphery of the enclosure E is sealed in particular by the wall 40a.

FIG. 2 allows to show that the envelope 37a mentioned above is formed of several successive walls such as the wall 40a and an annular shroud 64 located upstream of the wall 40a and connected to the internal periphery of the IGV 52.

The envelope 37b is formed by several successive walls and in particular an annular shroud 66 located upstream of the inlet casing 40. This shroud 66 extends around the shroud 64 and is connected to the external periphery of the IGV 52.

The envelope 39 is formed of several successive walls such as the wall 44a and an annular shroud 68 located upstream of the wall 44a. This shroud 68 extends around the shroud 66 and the upstream ends of the shrouds 66, 68 are connected together to form the splitter nose 34.

As discussed above, the electric machine 70 is located in an annular area Z, this area Z being delimited here upstream by the fan 14, and in particular the disc 32 connecting the fan vanes 30 to the fan shaft 32, and downstream by the bearing support 62.

Figure 3:
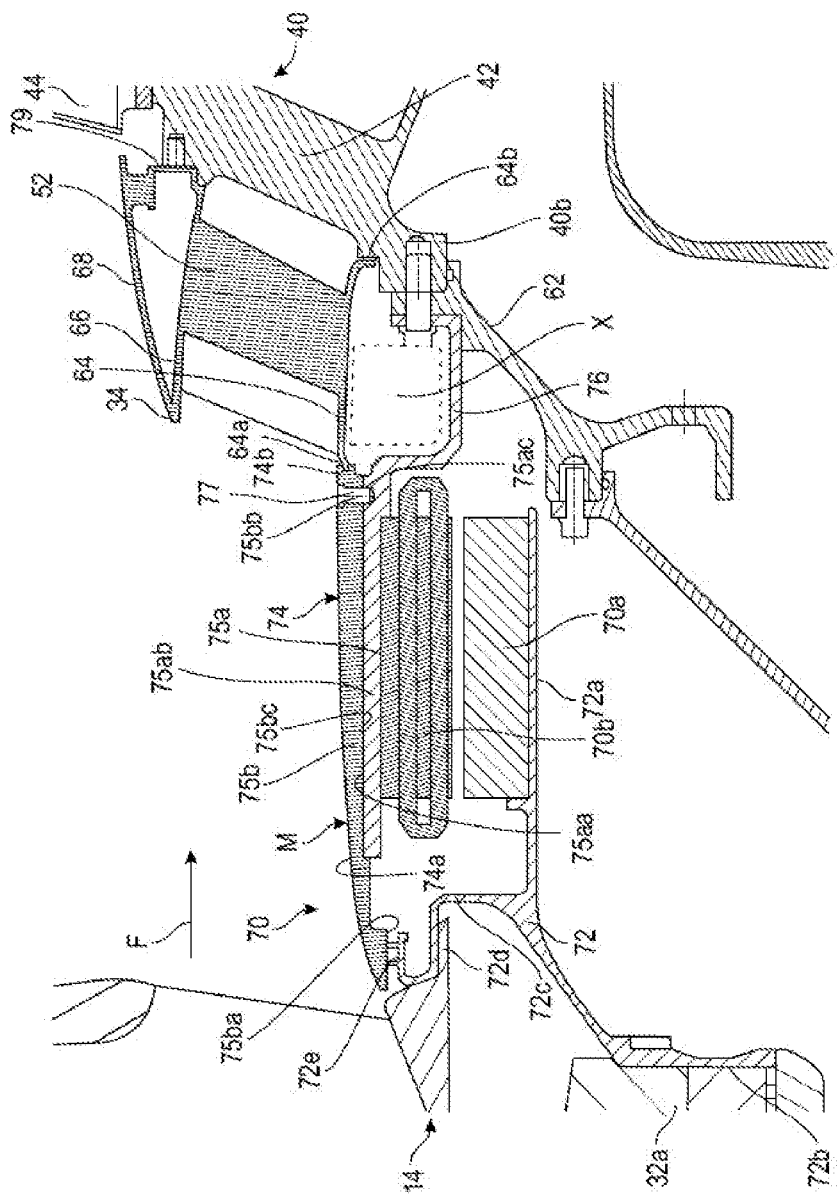
FIG. 3 is a larger scale view of a portion of FIG. 2 and shows an electric module according to the disclosure.

The machine 70, best seen in FIG. 3, has a generally annular shape and comprises a rotor 70a and a stator 70b. The rotor 70a has a generally annular shape extending about the axis A and is carried by a support element 72 which itself has a generally annular shape.

In the example shown, the support element 72 comprises a cylindrical wall 72*a* surrounded by the rotor 70*a* and attached to the internal periphery of the latter. The upstream end of this wall 72*a* is connected on the one hand to a radially internal annular flange 72*b* for attachment to the fan disc 32*a*, and on the other hand, to an external annular rim 72*c*.

The rim 72*c* comprises an internal cylindrical surface 72*d* bearing on an external cylindrical surface of the fan 14 so as to ensure the centring of the rotor 70*a*. The rim 72*c* further comprises external annular wipers 72*e* of a labyrinth type seal.

The stator 70*b* also has a generally annular shape and is carried by an annular support element 74 formed by the assembly of two annular and coaxial parts. The assembly comprising the stator 70*b* and its support element 74 forms an electric module M within the meaning of the disclosure.

The element 74 comprises:
an annular support 75*a* that surrounds and covers at least one portion of the stator 70*b* and is attached to the external periphery of the stator, and
an annular cover 75*b* that surrounds and covers at least one portion of the support 75*a*.

The cover 75*b* comprises a surface 74*a* that internally defines the flow duct of the gas flow F, between the fan 14 and the splitter nose 34. This surface 74*a* is thus swept by the gas flow F.

One of the particularities of this installation lies in the fact that the electric machine 70 and in particular its stator 70*b* is located as close as possible to the main flow F after passing through the fan 14. This allows on the one hand to have an electric machine with a large diameter and thus with a higher potential power than the technologies proposed so far, and on the other hand to have a machine which is cooled by the flow F. Advantageously, the thermal rejections of the electric machine are dissipated by this cooling.

For this purpose, the surface 74*a* swept by the flow F preferably has an aerodynamic profile, as shown in the drawing. The element 74 ensures the heat exchange by thermal conduction between the stator 70*b* and the flow F.

The cover 75*b* comprises at its upstream end an internal cylindrical surface 75*ba* which is for example coated with an abradable layer, and which cooperates with the aforementioned wipers 72*e*.

The downstream end of the cover 75*b* is axially aligned with the shroud 64, an upstream peripheral edge 64*a* of which is axially engaged in an annular groove 74*b* of the cover 75*b*. This groove 74*b* is oriented axially downstream. The engagement of the upstream edge 64*a* of the shroud 64 in the groove 74*b* ensures an overlap and thus avoids a step in the duct which would disturb the flow F.

In the vicinity of its downstream end in the example shown, the cover 75*b* comprises orifices 75*bb* for mounting screws 77. The orifices 75*bb* are oriented substantially radially with respect to the axis A and are preferably evenly distributed around this axis.

The cover 75*b* further comprises an internal cylindrical mounting surface 75*bc* fitted to an external cylindrical surface 75*aa* of the support 75*a*. The cover 75*b* is intended to be mounted on the support 75*a* by axially translating and sliding the cover on the support, and more particularly the surfaces 75*bc*, 75*aa* on top of each other, as will be described in more detail in the following.

The support 75*a* comprises a cylindrical wall 75*ab* connected at its downstream end to an annular flange 76 for attachment to the bearing support 42 or to the flange 40*a* of the inlet casing 40.

The wall 75*ab* comprises blind holes 75*ac* at its downstream end that are threaded and aligned with the orifices 75*bb* for the passage and screwing in of the screws 77.

The flange 76 is generally U-shaped in axial cross-section with the opening oriented radially outward. In the example shown, the flange 76 is attached by screws to a flange on bearing support 62 and to the flange 40*b* on the inlet casing.

The flange 76 thus defines an annular space X that serves for the electrical connection of the stator 70*b*. The space X is delimited externally by the shroud 64. It is thus understood that in the absence or disassembling of this shroud 64, one can access to the space X.

The stator 70*b* is connected by electrical connection means to a power electronic circuit 78 which is located between the two envelopes 37*b*, 39 and thus in the gas generator 12 (FIG. 2).

The means for electrically connecting the stator 70*b* to the circuit 78 may comprise harnesses 82 and one or more electrically conductive rigid bars 80.

Figure 5:
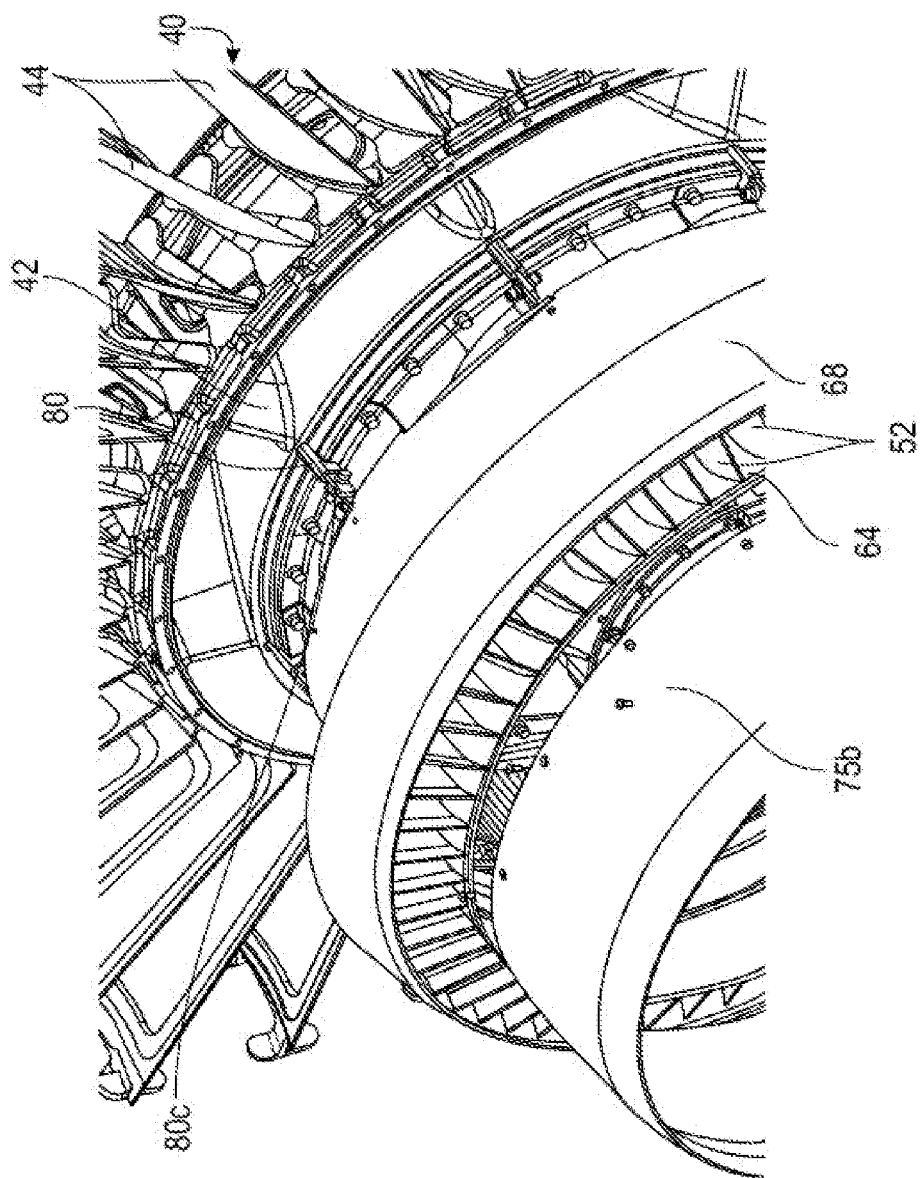
FIG. 5 is a schematic perspective view of a portion of the turbomachine in FIG. 2 and illustrates one of the steps in the maintenance method of the turbomachine.

In a preferred embodiment of the disclosure, the stator 70*b* is connected by a first electrical harness to one end of a bar 80, the opposite end of which is connected by a second electrical harness to the circuit 78. In this case, the cross-section of the core 82*a* of each harness 82 is preferably the same or close to the cross-section of the body 80*a* of the bar 80. The cross-section of the bar 80 and in particular of its body 80*a* is preferably constant over the entire length of the bar. FIG. 5 allows to show an end 80*c* of the bar 80 located in the space X and intended to be connected to the stator 70*b* by a harness 82.

FIG. 3 allows to see that the shrouds 64, 66, and 68 and the IGV 52 here form a one-piece annular assembly that is also visible in FIG. 5.

The shroud 64 is thus integral with the radially internal ends of the IGV 52. Its upstream end comprises the edge 64*a* engaged in the groove 74*b*, and its downstream end comprises an edge 64*b* bearing axially against a cylindrical shoulder of the inlet casing 40 or its flange 40*b*.

The shroud 66 is integral with the radially external ends of the IGV 52. Its upstream end is connected to the upstream end of the shroud 68 to form the splitter nose 34, as discussed above. The downstream ends of the shrouds 66, 68 are also connected together to form an annular flange 79 for attachment by screws or the like to the inlet casing 40.

FIGS. 4*a* through 4*d* and 5 illustrate steps in a maintenance method for the turbomachine 10.

In the order shown for the steps illustrated in FIGS. 4*a* to 4*d*, these steps allow the disassembling of the electric module M. It is understood that it is sufficient to repeat these steps in the reverse order to carry out an assembly or reassembly of the module Prior to the steps illustrated, the fan module including the fan 14 and the rotor 75*a* of the electric machine 70 is removed by translating axially upstream.

Figure 4A:
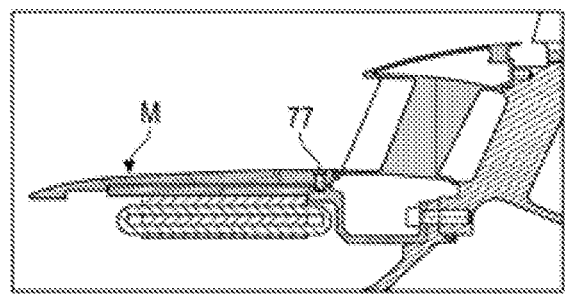
FIGS. 4a to 4d are views similar to FIG. 3 and illustrate steps of a method in the maintenance of the turbomachine.
Figure 4B:
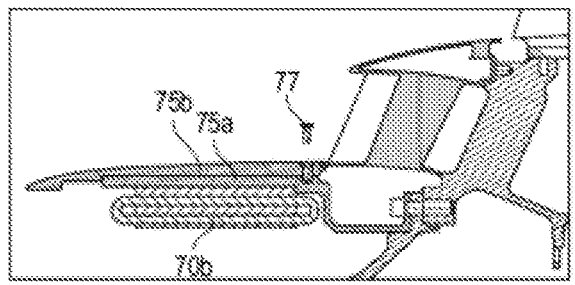

In the first step illustrated in FIGS. 4*a* and 4*b*, the screws 77 for attaching the cover 75*b* to the support 75*a* are unscrewed and removed. This allows the cover 75*b* to be disengaged from the support 75*a*.

Figure 4C:
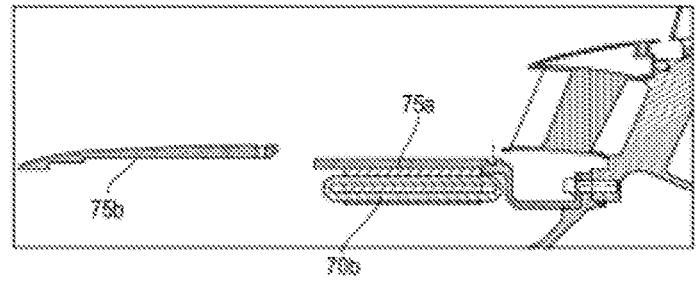

The cover 75*b* can then be removed by translating axially upstream (FIGS. 4*c* and 5).

Figure 4D:
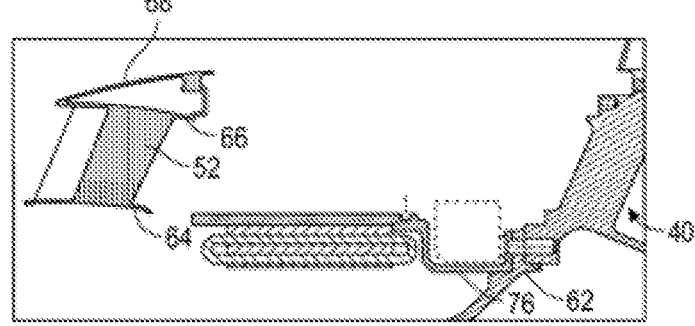

The assembly formed by the shrouds 64-68 and the IGV 52 is then removed by axial translation upstream (FIGS. 4*d* and 5).

The next step, not shown, is to disengage the flange 76 from the bearing support 62 and the inlet casing 40, so that the module M can be removed from which the cover 75b has already been removed.

Figure 6:
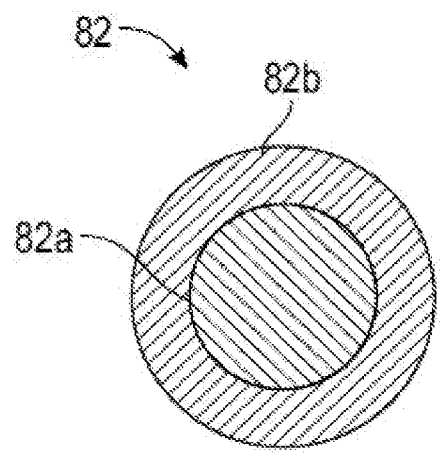
FIG. 6 is a schematic cross-sectional view of an electric harness.
Figure 7:
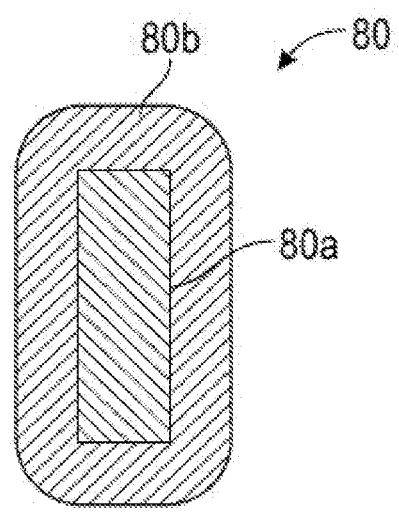
FIG. 7 is a schematic cross-sectional view of an embodiment of an electric connection bar.

FIG. 6 shows a cross-section of an electric harness 82 that is generally circular in shape and comprises a conductive core 82a formed by a strand of wires and an insulating external sheath 82b. FIG. 7 shows an example of an embodiment of a bar 80, which comprises a conductive body 80a preferably having a polygonal shape and for example rectangular in cross-section. The bar 80 further comprises an insulating external sheath 80b.

The present disclosure allows to provide many advantages:

- the bar 80 allows, contrary to a harness, very large bending radii; this is essential in the environment concerned; this allows to limit the thickness of the splitter nose 34 to a thickness close to that of the bar 80; moreover, the "twistable" profile of the bar allows to adapt according to the area crossed: radial position (in the plane P1) to enter the IGV 52 or the casing arm, and axial position (in the plane P2) to cross the inlet casing 40 at the level of an OGV 44;
- the bar 80 is rigid, so there is no risk of vibrations due to too much flexibility and therefore no need for specific support in the arms of the inlet casing 40;
- the path described above is compatible with all the oil auxiliaries circulating in the arms of the inlet casing 40; moreover, the walls of the inlet casing 40, and in particular the walls 40a and 42b, isolate the bar 80 from these oil auxiliaries, which limits the risk of fire; and
- the modularity linked to the ease of assembly/disassembly of the bar 80 by removing only a few parts of the turbomachine.

This disclosure could be applied to any turbomachine equipped with an electric machine upstream of a structural casing such as an inlet casing or other.

The invention claimed is:

1. An electric module for an aircraft turbomachine, the electric module comprising:
    a stator of an electric machine, said stator having an annular shape about an axis (A) and being configured to surround a rotor of the electric machine,
    an annular support element for said stator, said annular support element comprising an external annular surface configured to be swept by a gas flow from the aircraft turbomachine, the gas flow cooling the annular support element,
    said annular support element comprising:
    an annular support which surrounds and covers at least one portion of said stator and which is attached to an external periphery of the stator, the annular support comprising at least one flange configured to attach to a member of the aircraft turbomachine and being located at a downstream end of the stator, and
    an annular cover which surrounds at least one portion of said annular support and which comprises said external annular surface swept by the gas flow, said gas flow cooling the annular cover,
    wherein said annular cover is in radial abutment against said annular support along an entirety of an axial extent of the stator so as to cool the stator by radial conduction through the annular cover and through annular support along the entirety of said axial extent.

2. The electric module according to claim 1, wherein the annular support comprises a cylindrical wall covering the stator and connected by a downstream end to said at least one flange which is U-shaped in cross-section to define an annular space for electrical connection of said stator.

3. The electric module of claim 1, wherein the annular cover comprises at an upstream end an internal cylindrical surface configured to cooperate with annular wipers of a labyrinth seal.

4. The electric module according to claim 1, wherein said external annular surface swept by the gas flow extends over an entire longitudinal extent of said annular cover.

5. The electric module according to claim 1, wherein the annular cover comprises orifices oriented radially with respect to the axis, said orifices being aligned with threaded holes formed in the annular support, and screws being configured to be screwed into the orifices and the threaded holes in order to secure the annular cover to the annular support.

6. The electric module according to claim 1, wherein the annular cover comprises at a downstream end an annular groove oriented axially downstream and configured to receive a peripheral edge of another member of the aircraft turbomachine.

7. An aircraft turbomachine, comprising:
    a gas generator having a longitudinal axis,
    a fan located at an upstream end of the gas generator and configured to rotate about said longitudinal axis, and
    an electric machine with an annular shape which is mounted coaxially downstream of the fan, and which comprises a rotor rotatably coupled to the fan, and the electric module according to claim 1,
    the fan being configured to generate a main gas flow, a portion of which flows in a primary annular duct of the gas generator to form a primary flow, and another portion of which flows in a secondary annular duct extending between the gas generator and a nacelle casing to form a secondary flow,
    the primary annular duct being delimited by a first annular envelope and a second annular envelope that are coaxial with the gas generator, the primary annular duct being traversed by arms, referred to as IGV, configured to connect the first annular envelope and the second annular envelope, as well as by tubular arms of an inlet casing located downstream of the IGV,
    the gas generator comprising a third annular envelope which coaxially surrounds the second annular envelope,
    the second annular envelope and the third annular envelope being connected together at upstream ends to form an annular splitter nose that separates the primary flow and the secondary flows.

8. The aircraft turbomachine of claim 7, wherein the IGV are integrally formed with annular segments of the first annular envelope, the second annular envelope, and the third annular envelope so as to form an assembly, said assembly being configured to be attached to said inlet casing.

9. The aircraft turbomachine according to claim 8, wherein said assembly comprises at an external periphery an annular flange configured to attach to the inlet casing, and at an internal periphery, annular edges, respectively upstream and downstream, for support and/or engagement.

10. The aircraft turbomachine according to claim 7, wherein the electric machine and the inlet casing are attached to an annular bearing support of the gas generator, said annular flange being applied to and attached to the annular bearing support and/or to the inlet casing.

11. The aircraft turbomachine according to claim 7, further comprising a nacelle casing that surrounds the gas generator, as well as bladings, referred to as OGV configured to connect the nacelle casing to said third annular envelope.

12. A method for maintaining the aircraft turbomachine according to claim 8, comprising the steps of:
   disassembling and removing the rotor from the electric machine,
   disassembling and removing said annular cover from the stator of the electric module,
   disassembling and removing said assembly,
   disassembling and removing a rest of the electric module.

13. The electric module according to claim 2, wherein said annular space opens radially outward relative to said axis.

14. The electric module according to claim 6, wherein said peripheral edge is fitted into said annular groove.

15. The electric module according to claim 6, wherein said another member is secured to said annular cover by engagement of said peripheral edge into said annular groove.

* * * * *